US 6,538,744 B1

(12) United States Patent
Kimura-Suda et al.

(10) Patent No.: US 6,538,744 B1
(45) Date of Patent: Mar. 25, 2003

(54) METHOD FOR MEASURING SIMULTANEOUSLY ABSOLUTE MOLECULAR ORIENTATION WITH EFFECTIVE SECOND ORDER NONLINEAR OPTICAL CONSTANT AND APPARATUS THEREFOR (75) Inventors: Hiromi Kimura-Suda, Tokyo (JP); Takafumi Sassa, Tokyo (JP); Tatsuo Wada, Wako (JP); Hiroyuki Sasabe, Musashino (JP)

(73) Assignees: Riken, Saitama (JP); Japan Science and Technology Corporation, Saitama (JP)

( * ) Notice: Subject to any disclaimer, the term of this patent is extended or adjusted under 35 U.S.C. 154(b) by 106 days.

(21) Appl. No.: 09/666,410

(22) Filed: Sep. 20, 2000

(30) Foreign Application Priority Data

Mar. 17, 2000 (JP) ........................... 2000-076122

(51) Int. Cl.[7] ................................................. G01B 9/02
(52) U.S. Cl. .................... 356/450; 356/485; 356/492
(58) Field of Search .................................. 356/450, 485

(56) References Cited

U.S. PATENT DOCUMENTS 5,076,658 A * 12/1991 Hayden et al. .......... 359/341.1

OTHER PUBLICATIONS

Tang et al., J. Phys,: Condens. Matter 4 (1992), pp. 7965–7972.
Smiley et al., J. Chem. Phys. 103 (Aug. 22, 1995), pp. 3140–3144.
Higgins et al., Langmuir, vol. 8 No. 8 (1992), pp. 1994–2000.
Liu et al., Thin Solid Films 217 (1992), pp. 174–177.
Berkovic et al., J. Opt. Soc. Am. B, vol. 6 No. 2 (Feb. 1989), pp. 205–208.
Kemnitz et al. Chemical Physics Letters, vol. 131 No. 4,5 (Nov. 14, 1986), pp. 285–290.
Huang et al., Biophys. J. vol. 55 (May 1989), pp. 835–842.
Sato et al., J. Electronanal. Chem. 306 (1991), pp. 291–296.

* cited by examiner

*Primary Examiner*—Robert H. Kim
*Assistant Examiner*—Richard Kim
(74) *Attorney, Agent, or Firm*—Birch, Stewart, Kolasch & Birch, LLP (57) ABSTRACT

According to the present invention, it is adapted to calculate simultaneously an absolute molecular orientation with an effective second order nonlinear optical constant in an object to be measured without changing a measuring point. Further, in order that a period of time required for measuring an absolute molecular orientation and an effective second order nonlinear optical constant in an object to be measured is reduced, whereby a possibility of damaging the object to be measured can be minimized, measurement is carried out by the use of a single light source in accordance with SHG phase method without shifting the measuring point of the; object to be measured, so that the absolute molecular orientation and the effective second order nonlinear optical constant can be calculated from a fitting curve achieved as a result of fitting the fringe obtained by the above described measurement.

4 Claims, 6 Drawing Sheets

PLANE OF INCIDENCE OF MEASURING REFERENCE SAMPLE 100 AND THAT OF OBJECT TO BE MEASURED 200 ARE CONTAINED IN SAME PLANE. PLANE OF INCIDENCE OF PHASE GENERATOR 20 INTERSECT AT RIGHT ANGLES WITH THAT OF MEASURING REFERENCE SAMPLE 100 (OBJECT TO BE MEASURED 200).

FIG. 5

| REFRACTIVE INDEX | ω (1064nm) | 2ω (532nm) |
|---|---|---|
| GLASS SUBSTRATE 102 | 1.5194 | 1.5367 |
| MEASURING REFERENCE SAMPLE 100 | 1.4950 | 1.4970 |
| GLASS SUBSTRATE 202 | 1.5194 | 1.5367 |
| OBJECT TO BE MEASURED 200 | 1.4950 | 1.4970 |
| PHASE GENERATOR 20 | 1.5194 | 1.5367 |

| OTHER PARAMETERS | |
|---|---|
| WAVELENGTH OF FUNDAMENTAL WAVE | 1064nm |
| FILM THICKNESS OF MEASURING REFERENCE SAMPLE 100 | 2.5058 μm |
| FILM THICKNESS OF OBJECT TO BE MEASURED 200 | 2.5032 μm |
| THICKNESS OF PHASE GENERATOR 20 | 1.09mm |
| DISTANCE BETWEEN MEASURING REFERENCE SAMPLE 100 AND OBJECT TO BE MEASURED 200 | 280mm |

\*ANGLE OF INCIDENCE OF LASER BEAM OUTPUT FROM LIGHT SOURCE IS SET AT 30°, RESPECTIVELY.

\*SECOND ORDER NONLINEAR CONSTANT OF MEASURING REFERENCE SAMPLE 100 $d_{31}$ = 1.0pm/V
SECOND ORDER NONLINEAR CONSTANT OF MEASURING REFERENCE SAMPLE 100 $d_{33}$ = 3.0pm/V

METHOD FOR MEASURING SIMULTANEOUSLY ABSOLUTE MOLECULAR ORIENTATION WITH EFFECTIVE SECOND ORDER NONLINEAR OPTICAL CONSTANT AND APPARATUS THEREFOR

BACKGROUND OF THE INVENTION

1. Field of the Invention

The present invention relates to a method for measuring simultaneously an absolute molecular orientation with an effective second order nonlinear optical constant and the apparatus therefor, and more particularly to a method for measuring simultaneously an absolute molecular orientation with an effective second order nonlinear optical constant by which an absolute molecular orientation can be calculated simultaneously with an effective second order nonlinear optical constant without changing its measuring system as well as the apparatus therefor.

It is to be noted herein that the term "absolute molecular orientation" means "direction (direction in vector) of polar molecular alignment".

2. Description of the Related Art

It is recognized in general to obtain a higher second order nonlinear optical response with use of a polymer material is one of important problems in realizing an optical active element by the use of a polymer element.

In order to achieve such problem, development for a molecule having a high primary polarizability is important as a matter of course, besides it becomes also an important problem to increase a degree of molecular orientation in a medium by what kind of manner, and to obtain stable molecular orientation by what kind of manner.

Under the circumstances, it is considered that molecular orientation, i.e., generation of molecular polar alignment is influenced by molecules and a surrounding atmosphere of the molecules.

In order that a mechanism for such generation of molecular orientation is elucidated to obtain a higher degree of molecular orientation in a medium as well as to obtain a more stable molecular orientation, it is important to correctly grasp the molecular orientation in the medium.

Meanwhile, for example, a second harmonic generation phase method (hereinafter referred optionally to as "SHG phase method") has been known as a conventional manner for measuring a molecular orientation in a medium.

In the SHG phase method, it is arranged in such that a fringe obtained from an object to be measured having an unknown absolute molecular orientation is compared with a fringe obtained from a material having a known absolute molecular orientation to determine the absolute molecular orientation in the object to be measured.

On one hand, as a method for determining an effective second order nonlinear optical constant in a medium in response to a absolute molecular orientation in the medium, for example, Maker fringe method has been known.

In this respect, however, according to a conventional technique wherein an absolute molecular orientation in a medium is determined by the above described SHG phase method, while an effective second order nonlinear optical constant in response to an absolute molecular orientation in a medium is determined by the above described Maker fringe method, since a measuring system of the SHG phase method differs from that of the Maker fringe method, there has been such a problem that the absolute molecular orientation cannot be calculated simultaneously with the effective second order nonlinear optical constant in respect to the same measuring point of the same object to be measured.

Furthermore, according to the above described conventional technique, there have been also such problems that a long period of time is required for measuring an absolute molecular orientation as well as for measuring an effective second order nonlinear optical constant in an object to be measured, because measurement in SHG phase method in a measuring system as well as measurement in Maker fringe method in another measuring system are must be separately carried out, and that there is a tendency of damaging the object to be measured.

OBJECTS AND SUMMARY OF THE INVENTION

The present invention has been made in view of a variety of the above described problems involved in the prior art, so that an object of the invention is to provide a method for measuring simultaneously an absolute molecular orientation with an effective second order nonlinear optical constant as well as an apparatus therefor by which the absolute molecular orientation can be simultaneously calculated with the effective second order nonlinear optical constant in an object to be measured without changing its measuring point.

Moreover, another object of the present invention is to provide a method for measuring simultaneously an absolute molecular orientation with an effective second order nonlinear optical constant as well as an apparatus therefor by which a period of time for measuring the absolute molecular orientation and the effective second order nonlinear optical constant in an object to be measured can be reduced, and at the same time, a possibility of damaging the object to be measured can be minimized.

In order to achieve the above described objects, the present invention has been constituted in such that measurement is conducted by the use of a single light source in accordance with SHG phase method without shifting a measuring point of an object to be measured, a fringe attained by the measurement is subjected to fitting to obtain a fitting curve, and an absolute molecular orientation and an effective second order nonlinear optical constant are calculated from the fitting curve.

Accordingly, as a result of single measurement according to SHG phase method, an absolute molecular orientation and an effective second order nonlinear optical constant in an object to be measured can be calculated at the same time without changing a measuring point thereof in accordance with the present invention.

Furthermore, according to the present invention, since it is sufficient for conducting only single measurement of SHG phase method, a period of time required for measuring an absolute molecular orientation and an effective second order nonlinear optical constant in an object to be measured can be reduced so that a possibility of damaging the object to be measured can be minimized.

Namely, the present invention comprises a first step for obtaining a fringe as to an object to be measured by the use of a measuring reference sample in accordance with second harmonic generation phase method wherein a single light source is used; and a second step for fitting the fringe obtained in the above described first step to obtain an effective second order nonlinear optical constant and at the same time, to obtain an absolute molecular orientation on the basis of a sign of the effective second order nonlinear optical constant.

In this case, the fitting in the above described second step may conduct fitting of the fringe in such a manner that known values are substituted for an operation expression representing a power of second harmonics at the position where second harmonics generated from the measuring reference sample in accordance with the second harmonic generation phase method interfere with other second harmonics generated from the object to be measured thereby changing fitting parameters.

Moreover, the present invention relates to a measuring apparatus of the type containing a light source as well as a measuring reference sample, a phase generator, and an object to be measured which are successively disposed on an optical path of the above described light source, and obtaining a fringe as to the object to be measured by the use of the measuring reference sample in accordance with second harmonic generation phase method, comprising a fitting means for, fitting a fringe as to the object to be measured; and an acquiring means for obtaining an effective second order nonlinear optical constant on the basis of the fitting by the above described fitting means and at the same time, obtaining an absolute molecular orientation based on a sign of the effective second order nonlinear optical constant.

In this case, the above described fitting means may conduct fitting of the fringe in such a manner that known values are substituted for an operation expression representing a power of second harmonics at the position where second harmonics generated from the measuring reference sample in accordance with the above described second harmonic generation phase method interfere with other second harmonics generated from the object to be measured thereby changing fitting parameters.

Still further, the present invention relates to a recording medium readable by a computer, constituted in such that a program for executing by the computer the method for measuring simultaneously an absolute molecular orientation with an effective second order nonlinear optical constant of the invention as described above is stored therein.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIGS. 3(a) and 3(b) are explanatory views showing parameters used for measurement according to SHG phase method as well as for fitting wherein

DETAILED DESCRIPTION OF THE PREFERRED EMBODIMENTS

An example of embodiment of a method for measuring simultaneously an absolute molecular orientation with an effective second order nonlinear optical constant as well as an apparatus therefor according to the present invention will be described in detail hereinafter by referring to the accompanying drawings.

Figure 1:
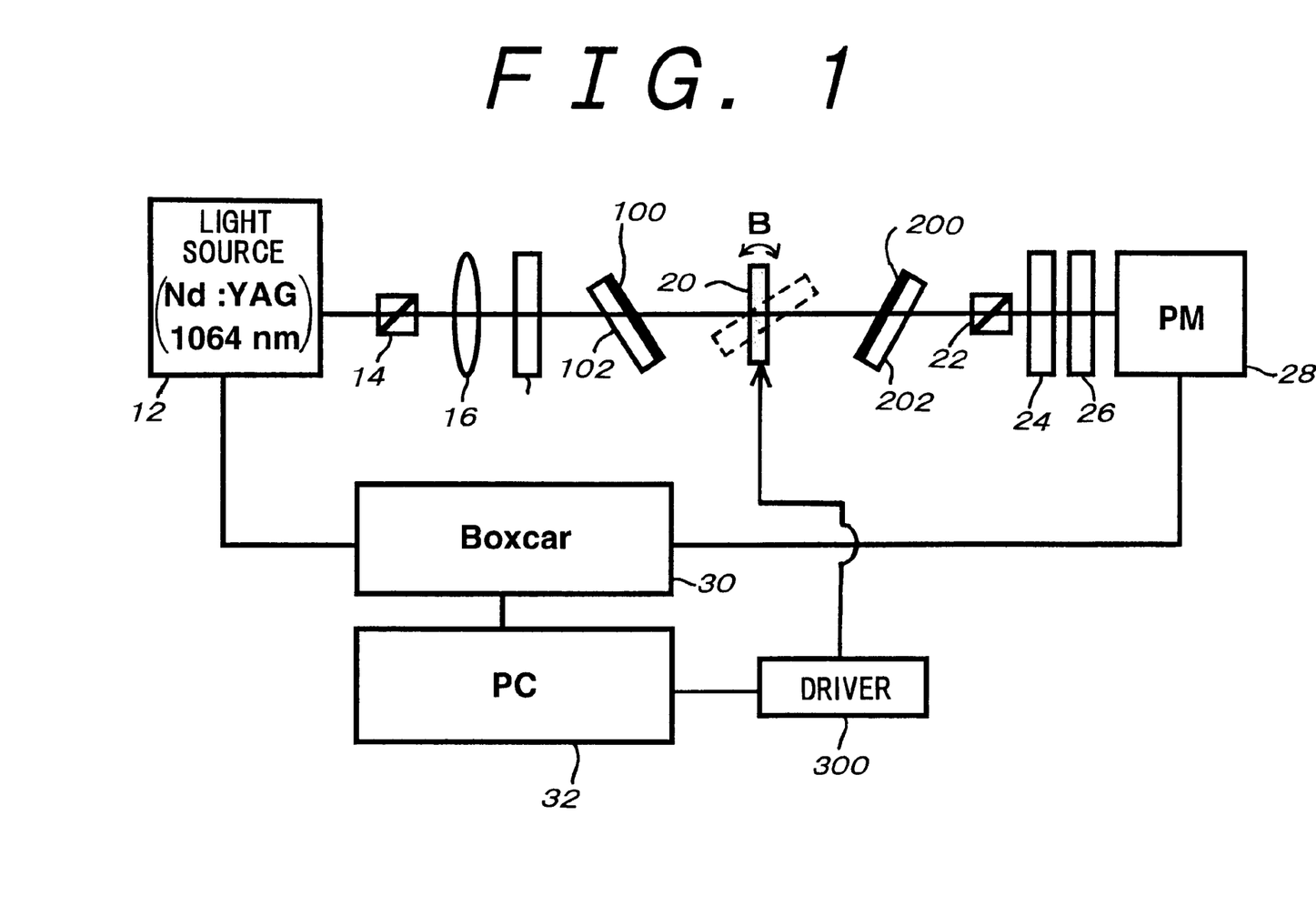
FIG. 1 is an explanatory view for conceptual constitution of an example of embodiment illustrating an apparatus for measuring simultaneously an absolute molecular orientation with an effective second order nonlinear optical constant according to the present invention.

FIG. 1 is an explanatory view for conceptual constitution of an example of embodiment illustrating an apparatus for measuring simultaneously an absolute molecular orientation with an effective second order nonlinear optical constant according to the present invention wherein an object to be measured 200 which is a second order nonlinear optical material is measured by the apparatus for measuring simultaneously an absolute molecular orientation with an effective second order nonlinear optical constant (hereinafter merely referred optionally to as "measuring apparatus" 10 according to the present invention in accordance with SHG phase method. The measuring apparatus 10 contains a light source 12, and on an optical path of the light source 12 are successively disposed a first polarizer 14, a beam-condensing lens 16, a first filter 18, a phase generator 20, a second polarizer 22, a second filter 24, a third filter 26, a PM (photomultiplier tube) 28, in addition, the measuring apparatus is provided further with a Boxcar 30 and a PC (personal computer) 32.

Moreover, a measuring reference sample 100 formed as a thin film on a glass substrate 102 is disposed in between the first filter 18 and the phase generator 20 on the optical path of the light source 12, while an object to be measured 200 formed as a thin film on a glass substrate 202 is disposed in between the phase generator 20 and the second polarizer 22 on the optical path of the light source 12.

The phase generator 20 is composed of, for example, a glass substrate and the like. The phase generator 20 is further sample 100 is known which is decided dependent upon an electric field applied by corona poling, and it is perpendicular to the glass substrate 102.

According to the above-mentioned constitution, the whole operation is controlled by the personal computer 32 in the above described measuring apparatus 10.

In the case when measurement according to SHG phase method is carried out with respect to the object to be measured 200 by the use of the measuring apparatus 10, the measurement is conducted in accordance with a two-step measuring procedure which will be described hereunder.

First, the measurement is conducted in a condition where the object to be measured 200 which had been formed on the glass substrate 202 has been set in the measuring apparatus 10, i.e., in the condition shown in FIG. 1.

Then, intensity of second harmonics generated from only the measuring reference sample 100 is measured in a condition where only the measuring reference sample 100 has been set in the measuring apparatus 10 without setting the object to be measured 200 which had been formed on the glass substrate 202.

It is to be noted that the above described two-step measuring procedure may be carried out in accordance with the inverse order of the above description, that is, the measurement is first carried out in a condition where only the measuring reference sample 100 has been set in the measuring apparatus 10, and then the following measurement is conducted in a condition where the object to be measured 200 which had been formed on the glass substrate 202 has been set in the measuring apparatus 10. connected to a driving mechanism 300, so that it is rotatable by driving operation of the driving mechanism 300 as shown by the arrow B in FIG. 1, whereby the phase generator 20 is positioned, for example, as shown by the broken line in FIG. 1. Thus, a length of the optical path is variable in the measuring apparatus 10.

In the present embodiment, for example, an Nd:YAG laser having 1064 nm wavelength ($\lambda$) of fundamental wave may be used as the light source 12.

When the Nd:YAG laser the wavelength of fundamental wave of which is 1064 nm is used, the first filter 18 is an edge filter which cuts second harmonics ($\lambda$=532 nm) and puts through the fundamental wave ($\lambda$=1064 nm) of the Nd:YAG laser, the second filter 24 is a $CuSO_4$ filter which cuts infrared light, and the third filter 26 is a laser line filter which puts through only second harmonics ($\lambda$=532 nm) of the Nd:YAG laser.

Figure 2:
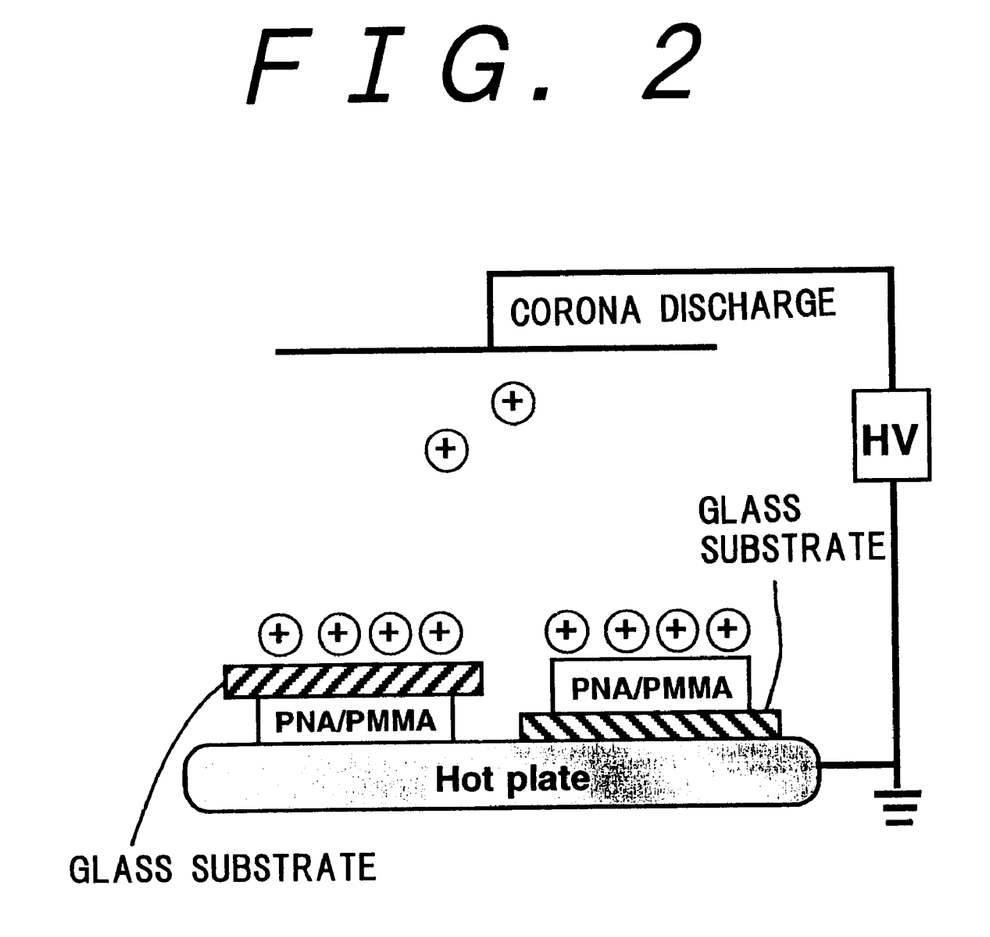
FIG. 2 is an explanatory view illustrating corona poling.

Further, in the present embodiment, a thin film prepared by such a manner that the glass substrate 102 is spin-coated with a mixture obtained by admixing P-nitroaniline (PNA) with polymethyl methacrylate (PMMA) (hereinafter a thin film prepared by spin-coating a glass substrate with a mixture obtained by admixing PNA with PMMA is referred optionally to as "PNA/PMMA") to obtain, for example, 2.5 $\mu$m or less thickness is processed by the use of corona poling as shown in FIG. 2 in such that dipole ($\mu$) of PNA is subjected to electric field orientation, and the resulting thin film is used as the measuring reference sample 100. An absolute orientation of PNA in a PNA/PMMA being a thin film used as the measuring reference Thereafter, an absolute molecular orientation is simultaneously calculated with an effective second order nonlinear optical constant of the object to be measured 200 by fitting a fringe obtained by the measurement by the use of the undermentioned formula (10) without changing its measuring system.

In the following, a manner for the measurement will be described in detail.

A fundamental wave ($\lambda$=1064 nm) output from an Nd:YAG laser being the light source 12 is input to the first polarizer 14, and it passes through the first polarizer 14, whereby P-polarized light is obtained.

Then, laser beam P-polarized is condensed by the beam-condensing lens 16 to narrow down a beam diameter, and the resulting laser beam is further input to the first filter 18, whereby second harmonics ($\lambda$=532 nm) generated by passing through the polarizer 14 and the like are cut by the first filter 18.

In this situation, second harmonics ($\lambda$=532 nm) arise at the time when the fundamental wave ($\lambda$=1064 nm) which passed through the first filter 18 passes through the measuring reference sample 100, and the fundamental wave ($\lambda$=1064 nm) passes also through the measuring reference sample 100 at the same time.

Figures 3A, 3B:
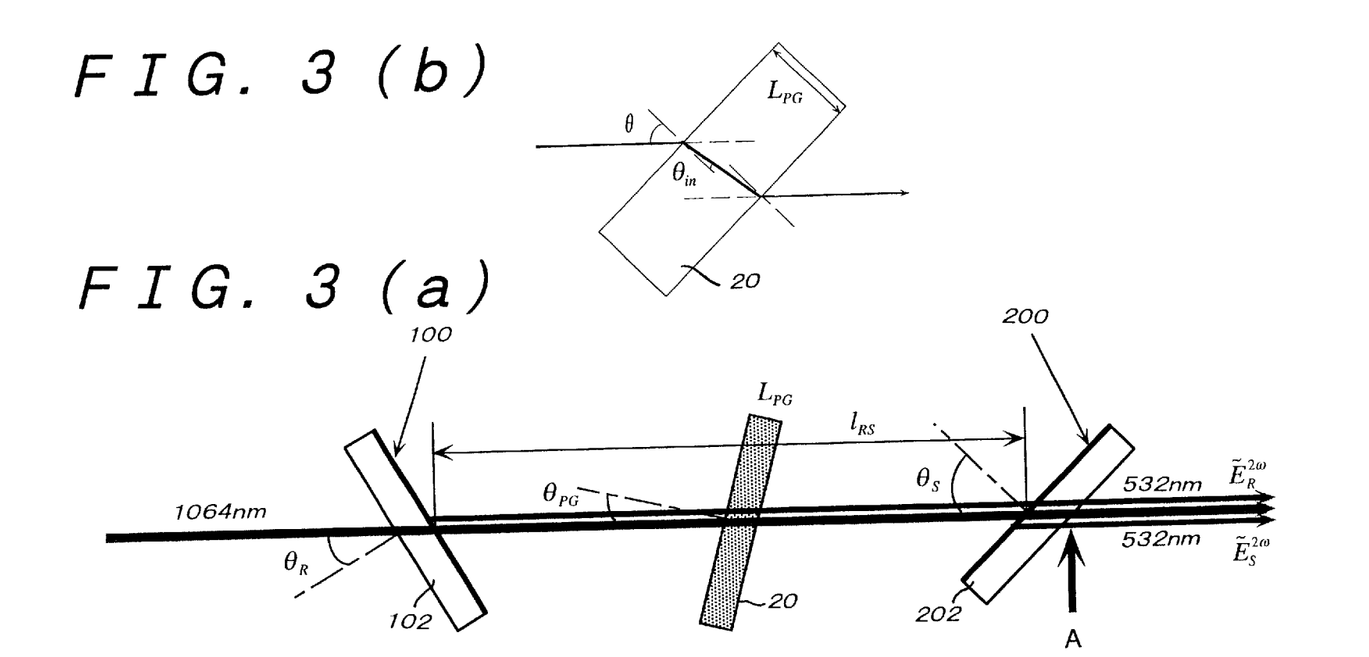
FIG. 3(a) is a constitutional explanatory view showing an essential part of the measuring apparatus shown in FIG. 1.
FIG. 3(b) is an enlarged explanatory view showing the phase generator shown in FIG. 3(a)

In this case, an angle of incidence $\theta_R$ has been set to "$\theta_R \neq 0$" of as shown in the undermentioned FIG. 3(a) in order to generate the second harmonics ($\lambda$=532 nm) by means of the measuring reference sample 100.

Moreover, the laser beam (fundamental wave ($\lambda$=1064 nm) and second harmonics ($\lambda$=532 nm)) which passed through the measuring reference sample 100 is allowed to pass through the phase generator 20, and in this case, the phase generator 20 is rotated by driving operation of the driving mechanism 300 controlled by the personal computer 32 to change an optical length.

Thereafter, when the fundamental wave ($\lambda$=1064 nm) which passed through the phase generator 20 passes through the object to be measured 200 being a second order nonlinear optical material, second harmonics ($\lambda$=532 nm) arise by means of the object to be measured 200.

In this case, the second harmonics ($\lambda$532 nm) generated by the above described object to be measured 200 interfere with the second harmonics ($\lambda$=532 nm) generated by the measuring reference sample 100 to obtain a fringe. Namely, the measuring apparatus 10 is arranged as shown in the undermentioned FIG. 3(a) in such that a distance (positional relationship) defined between the measuring reference sample 100 and the object to be measured 200 is fixed, and the phase generator 20 positioned in between the measuring reference sample 100 and the object to be measured 200 is rotated, whereby a length of optical path is changed to obtain a fringe.

The laser beam (fundamental wave ($\lambda$=1064 nm) and the second harmonics ($\lambda$=532 nm) ) which passed through the object to be measured 200 are input to the second polarizer 22, and only the light of P-polarized light is selected as a result of passing through the second polarizer 22.

Then, the P-polarized laser beam (fundamental wave ($\lambda$=1064 nm) and second harmonics ($\lambda$=532 nm)) are input to the second filter 24, hence infrared light is cut out by means of the second filter 24, further the laser beam from which has been cut out infrared light by means of the second filter 24 is input to the third filter 26, whereby only the second harmonics( $\lambda$=532 nm) pass through the third filter 26 to be detected by the photomultiplier tube 28.

Figure 6:
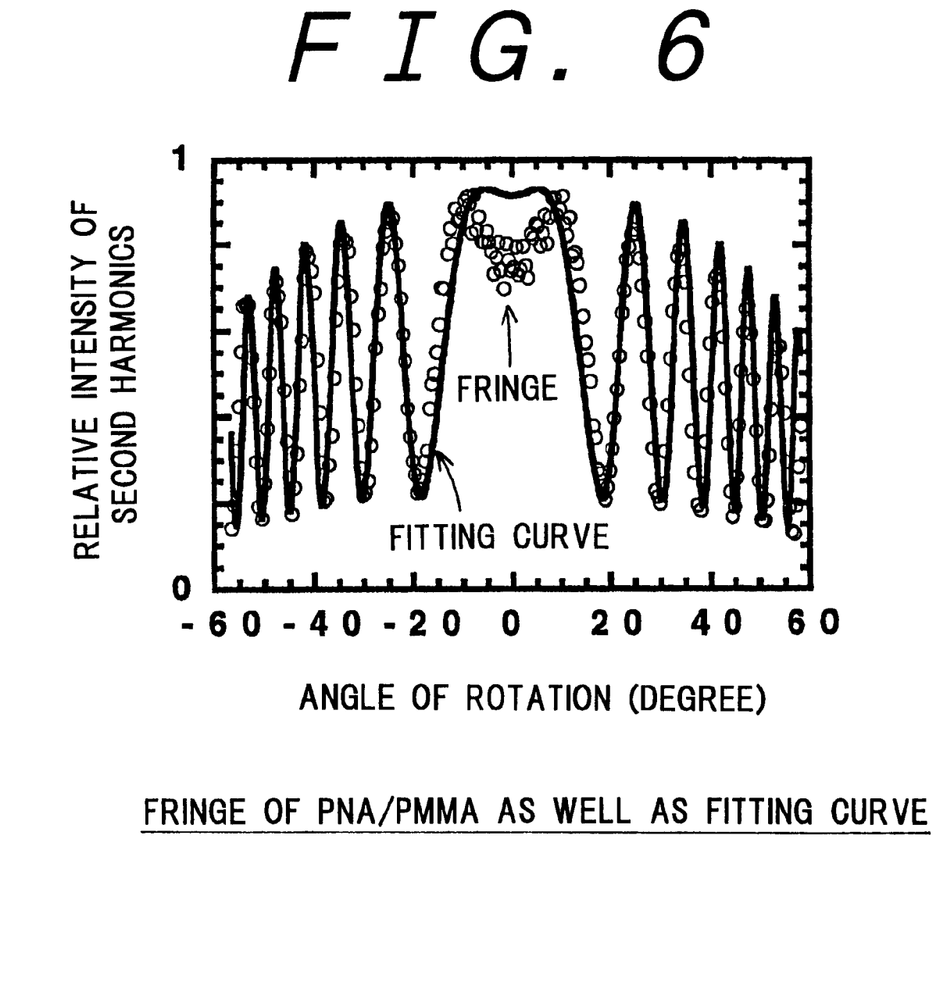
FIG. 6 is a graphical representation showing a fringe in PNA/PMMA and a fitting curve.

The second harmonics ($\lambda$=532 nm) thus detected by the photomultiplier 28 are integrated in the Boxcar 30, and as a result of known processing, a fringe relating to the object to be measured 200 is output as a function between intensity of second harmonics (expressed as relative intensity in FIG. 6) and an angle of rotation of the phase generator 20 as indicated by a plot of marks "○" in the graph of FIG. 6.

In case of measuring the intensity of second harmonics arising from only the measuring reference sample 100, it is carried out in a condition where the object to be measured 200 has not been set on its optical path as described above.

As in the case of measurement according to a conventional SHG phase method, when a fringe obtained by the above described measuring manner is compared with a fringe obtained in the case when an object to be measured 200 having known absolute molecular orientation has been set in the measuring apparatus 10, it is possible to determine an absolute molecular orientation, which has been unknown, of another object to be measured 200. However, when a manner of fitting in the method for measuring an absolute molecular orientation simultaneously with an effective second order nonlinear optical constant and an apparatus there for according to the present invention which will be described hereinafter is applied, an effective second order nonlinear optical constant of an object to be measured 200 can be calculated, besides an absolute molecular orientation of the object to be measured 200 can be also calculated in connection with the former calculation.

Namely, as described hereunder, when a fringe obtained by the above described measuring manner is subjected to fitting, the effective second order nonlinear optical constant of an object to be measured 200 can be calculated, and the absolute molecular orientation is also calculated in connection with the former calculation.

The above described processing of fitting will be described in detail hereinafter, and in this respect it is to be noted that the processing of fitting is executed under the control of the personal computer 32.

Alternatively, it can be arranged in such that a program for executing the processing of fitting by means of a computer is stored in a recording medium being readable by computer, and a given computer is operated in accordance with the program stored in the recording medium.

The term "fitting" used herein means generally a manner for analysis wherein parameters involved in a theoretical formula expressing a model are changed so as to fit the most suitably to measurement values. Further, parameters which are changed in fitting are called by the name of "fitting parameters".

In case of the present invention, a graph is obtained as a result of measurement, and further a film thickness and a refractive index of a thin film being an object to be measured 200 are known as inherent values. Under the circumstances, a graph obtained by substituting these known values for the theoretical formula is closed with, namely fitted to the graph obtained by the measurement by varying the parameters (fitting parameters) involved in the theoretical formula.

Thus, in respect of the graph obtained by processing of fitting, since a theoretical formula representing the graph and values in the respective parameters are apparent, it is possible to determine unknown values in an actual measuring system by utilizing these factors.

In this case, a curve represented by a graph obtained by fitting is called by the name of "fitting curve".

Next, in case of fitting a fringe obtained by the above described measuring manner, first, a theoretical background thereof will be explained by referring to FIGS. 3(a) and 3(b).

FIG. 3(a) is a constitutional explanatory view showing an essential part of the measuring apparatus 10 shown in FIG. 1, and FIG. 3(b) is an enlarged explanatory view showing the phase generator shown in FIG. 3(a).

Second harmonics (hereinafter referred optionally to as "SH wave") generated from a measuring reference sample 100 and having 532 nm wavelength interferes with an SH wave generated from an object to be measured 200 at a point A in FIG. 3(a).

Thus, first, when amplitude intensity of the SH wave observed at the point A is studied, the SH wave generated from the measuring reference sample 100 and the SH wave generated from the object to be measured 200 are expressed by equations (1) and (2), respectively.

Namely, an amplitude intensity $\tilde{E}_R^{2\omega}(\theta_R, \theta_{PG}, \theta_S)$ of the SH wave generated from the measuring reference sample 100 is expressed by the equation:

$$\tilde{E}_R^{2\omega}(\theta_R, \theta_{PG}, \theta_S) = T_R^{2\omega}(\theta_R, \theta_{PG}, \theta_S) E_R^{2\omega}(\theta_R) \exp[-i\{\phi_R^{2\omega}(\theta_R) + \phi_I^{2\omega}(\theta_{PG})\}] \quad (1)$$

On one hand, amplitude intensity $\tilde{E}_S^{2\omega}(\theta_R, \theta_{PG}, \theta_S)$ of the SH wave generated from the object to be measured 200 is expressed by the equation:

$$\tilde{E}_S^{2\omega}(\theta_R, \theta_{PG}, \theta_S) = T_S^{\omega}(\theta_R, \theta_{PG}, \theta_S) E_S^{2\omega}(\theta_S) \exp[-i\{\phi_S^{2\omega}(\theta_S) + 2\phi_I^{\omega}(\theta_{PG})\}] \quad (2)$$

wherein meanings of respective parameters in the above described respective equations are as follows:

$T_R^{2\omega}$: transmittance experienced by the SH wave generated from REFERENCE $T_S^{\omega}$: transmittance experienced by a fundamental wave before reaching SAMPLE $\phi_I^{2\omega}$: phase change experienced by the SH wave generated from REFERENCE $\phi_I^{2\omega}$: phase change experienced by the fundamental wave before reaching SAMPLE $E_R^{2\omega}$: amplitude intensity of the SH wave generated in a nonlinear layer of REFERENCE $\phi_R^{2\omega}$: initial phase of the SH wave generated in the nonlinear layer of REFERENCE $E_S^{2\omega}$: amplitude intensity of the SH wave generated in a nonlinear layer of SAMPLE $\phi_S^{2\omega}$: initial phase of the SH wave generated in the nonlinear layer of SAMPLE Moreover, a superscript "ω" in the respective parameters means a frequency of fundamental wave (λ=1064 nm), and a superscript "2ω" in the respective parameters means a frequency of SH wave.

A parameter contains either of both the superscripts "ω" and "2ω" means that there is a case of a frequency of fundamental wave (λ=1064 nm) or a case of a frequency of SH wave, respectively.

Furthermore, a subscript "R" in the respective parameters means a measuring reference sample 100, and a subscript "S" in the respective parameters means an object to be measured 200.

A parameter contains either of both the subscripts "R" and "S" means that there is a case of the measuring reference sample 100 or a case of the object to be measured 200, respectively.

A factor $E_{R,S}^{2\omega}$ is given by Maker fringe theoretical formula represented by the equation:

$$E_{R,S}^{2\omega}(\theta_{R,S}) = A_{R,S}^{const}(\theta_{R,S}) d_{R,S}^{eff}(\theta_{R,S}) \{t_{R,S}^{\omega}(\theta_{R,S}) E_0^{\omega}\}^2 \quad (3)$$

In the equation (3), a factor $A_{R,S}^{const}$ represents a constant including permeabilities in vacuum, dielectric constants in vacuum, frequencies 2ω, and refractive indices of a measuring reference sample 100 and an object to be measured 200, a factor $d_{R,S}^{eff}$ R represents effective second order nonlinear optical constants of the measuring reference sample 100 and the object to be measured 200, a factor $t_{R,S}^{\omega}$ represents transmittances of fundamental wave with respect to the measuring reference sample 100 and the object to be measured 200, and a factor $E_0^{\omega}$ represents amplitude intensity of fundamental wave before passing through the measuring reference sample 100.

Meanwhile, Maker fringe theoretical formula represented by the above described equation (3) is an operation expression for determining a second order nonlinear optical constant from interference fringes of an output of second harmonics obtained by changing a distance (optical path length) along which lightwave propagates through a nonlinear medium. To determine a second order nonlinear optical constant of a medium, the Maker fringe theoretical formula is usually employed.

In the meantime, SH power $P_{total}^{2\omega}$ observed at the point A in FIG. 3(a) is expressed by a formula:

$$P_{total}^{2\omega} |\tilde{E}_R^{2\omega}|^2 + |\tilde{E}_S^{2\omega}|^2 + \tilde{E}_R^{2\omega} \tilde{E}_S^{2\omega*} + \tilde{E}_R^{2\omega*} \tilde{E}_S^{2\omega} \quad (4)$$

by utilizing the equations (1) and (2) wherein each thickness of a nonlinear layer of the measuring reference sample 100 and a nonlinear layer of the object to be measured 200 is thin, so that contributions of them to phase change of lightwave may be ignored. Accordingly, when it is supposed that $\phi_{R,S}^{2\omega} \approx 0$, the formula (4) can be developed by using the respective parameters to simplify the same as represented by the formula:

$$P_{total}^{2\omega} \approx [T_R^{2\omega} E_R^{2\omega}]^2 + [T_S^{2\omega} E_S^{2\omega}]^2 + 2 T_R^{2\omega} T_S^{2\omega} E_R^{2\omega} E_S^{2\omega} \cos(\phi_I^{2\omega} - 2\omega_I^{\omega}) \quad (5)$$

wherein $\phi_I^{2\omega}-2\phi_1^{\omega}$ appeared in the third term of the formula (5) indicates period of fringe observed and which is composed of a refractive index of air $n_{air}^{\omega}$ with respect to fundamental wave ($\lambda$=1064 nm), a refractive index of air $n_{air}^{2\omega}$ with respect to SH wave, a refractive index of a phase generator 20 $n_{PG}^{\omega}$ with respect to fundamental wave ($\lambda$=1064 nm), a refractive index of the phase generator 20 $n_{PG}^{2\omega}$ with respect to SH wave, a distance $l_{RS}$ between the measuring reference sample 100 and the object to be measured 200, and a thickness $L_{PG}$ of the phase generator 20.

Namely, an equation:

$\phi_I^{2\omega}-2\phi_I^{2\omega}$ $$\phi_I^{2\omega} - 2\phi_I^{\omega} = 2\left(\frac{2\pi}{\lambda^{\omega}}\right)\left[\Delta n_{air}l_{RS} + L_{PG}\left\{\left(\frac{n_{PG}^{2\omega}}{\cos\theta_{PG,in}^{2\omega}} - \frac{n_{PG}^{\omega}}{\cos\theta_{PG,in}^{\omega}}\right) - \left(\frac{n_{air}^{2\omega}\cos(\theta_{PG} - \theta_{PG,in}^{2\omega})}{\cos\theta_{PG,in}^{2\omega}} - \frac{n_{air}^{\omega}\cos(\theta_{PG} - \theta_{PG,in}^{\omega})}{\cos\theta_{PG,in}^{\omega}}\right)\right\}\right] \quad (8)$$

is obtained from equation:

$$\phi_I^{2\omega} = \left(\frac{2\pi}{(\lambda^{\omega}/2)}\right)[n_{air}^{2\omega}l_{RS} + (L_{PG}/\cos\theta_{PG,in}^{2\omega})\{n_{PG}^{2\omega} - n_{air}^{2\omega}\cos(\theta_{PG} - \theta_{PG,in}^{2\omega})\}] \quad (6)$$

and an equation:

$$2\phi_I^{\omega} = 2\left(\frac{2\pi}{\lambda^{\omega}}\right)[n_{air}^{\omega}l_{RS} + (L_{PG}/\cos\theta_{PG,in}^{\omega})\{n_{PG}^{\omega} - n_{air}^{\omega}\cos(\theta_{PG} - \theta_{PG,in}^{\omega})\}] \quad (7)$$

In the above described equations (6), (7) and (8), a symbol "$\lambda^{\omega}$" means a wavelength ($\lambda$=1064 nm) of fundamental wave.

In this condition, since a relationship "$\Delta n_{air} \ll \Delta n_{PG}$" comes into existence between dispersion $\Delta n_{air}$ of air and dispersion $\Delta n_{PG}$ of the phase generator 20, the equation (8) may be finally represented as expressed by a formula:

$\phi_I^{2\omega}-2\phi_I^{\omega}$ $$\phi_I^{2\omega} - 2\phi_I^{\omega} \approx 2\left(\frac{2\pi}{\lambda^{\omega}}\right)\left[\Delta n_{air}l_{RS} + L_{PG}\left\{\left(\frac{n_{PG}^{2\omega}}{\cos\theta_{PG,in}^{2\omega}} - \frac{n_{PG}^{\omega}}{\cos\theta_{PG,in}^{\omega}}\right) - \left(\frac{\cos(\theta_{PG} - \theta_{PG,in}^{2\omega})}{\cos\theta_{PG,in}^{2\omega}} - \frac{\cos(\theta_{PG} - \theta_{PG,in}^{\omega})}{\cos\theta_{PG,in}^{\omega}}\right)\right\}\right] \quad (9)$$

In this case, fitting can be conducted in accordance with such a manner that the formulae (5) and (9) are used, and the formula (9) is substituted for the formula (5), whereby a substitution of known values are made to change fitting parameters. As a result, it becomes possible to obtain a fitting curve as shown in FIG. 6, and thus, a graph of theoretical formula which is allowed to approximate a graph obtained by measurement can be achieved.

More specifically, when known values are substituted for the formula (5) expressing an SH power of second harmonics (SH wave) at the point A being a position where second harmonics (SH wave) generated from the measuring reference sample 100 interfere with second harmonics (SH wave) generated from the object to be measured 200 thereby to change fitting parameters, fitting of fringe can be attained.

While processing of fitting may be conducted by the use of the theoretical formula represented by the formula (5) as described above, calculation may be made with inclusion of information relating to a beam width of SH wave, because no information as to the beam width of SH wave is included in the theoretical formula represented by the formula (5). In this respect, calculation is made with inclusion of information relating to a beam width of SH wave in the case where a fitting curve shown in FIG. 6 which will be mentioned hereunder is obtained.

Specifically, fitting calculation was made with taking base change in fringe produced from differences in fundamental spot sizes (power densities) due to beam-condensing of the beam-condensing lens 16 into consideration.

More specifically, the above described base change in fringe produced from differences in fundamental spot sizes due to beam-condensing of the beam-condensing lens 16 is given by a parameter S, and the formula (5) is modified by allowing a width of SH beam generated from the object to be measured 200 at a point of observation (the point A in FIG. 3(a)) to include therein as a ratio with respect to a width of SH beam produced from the measuring reference sample 100 at the point of observation (the point A in FIG. 3(a)), whereby a formula:

$$P_{total}^{2\omega} = [T_R^{2\omega}E_R^{2\omega}]^2 + (1/S)[T_S^{2\omega}E_S^{2\omega}]^2 + 2T_R^{2\omega}T_S^{2\omega}E_R^{2\omega}E_S^{2\omega}\cos(\phi_I^{2\omega}-2\phi_I^{\omega}) \quad (10)$$

was obtained as a formula expressing SH power.

In case of processing for fitting, the formula (10) may be used in place of the formula (5).

Figure 4:
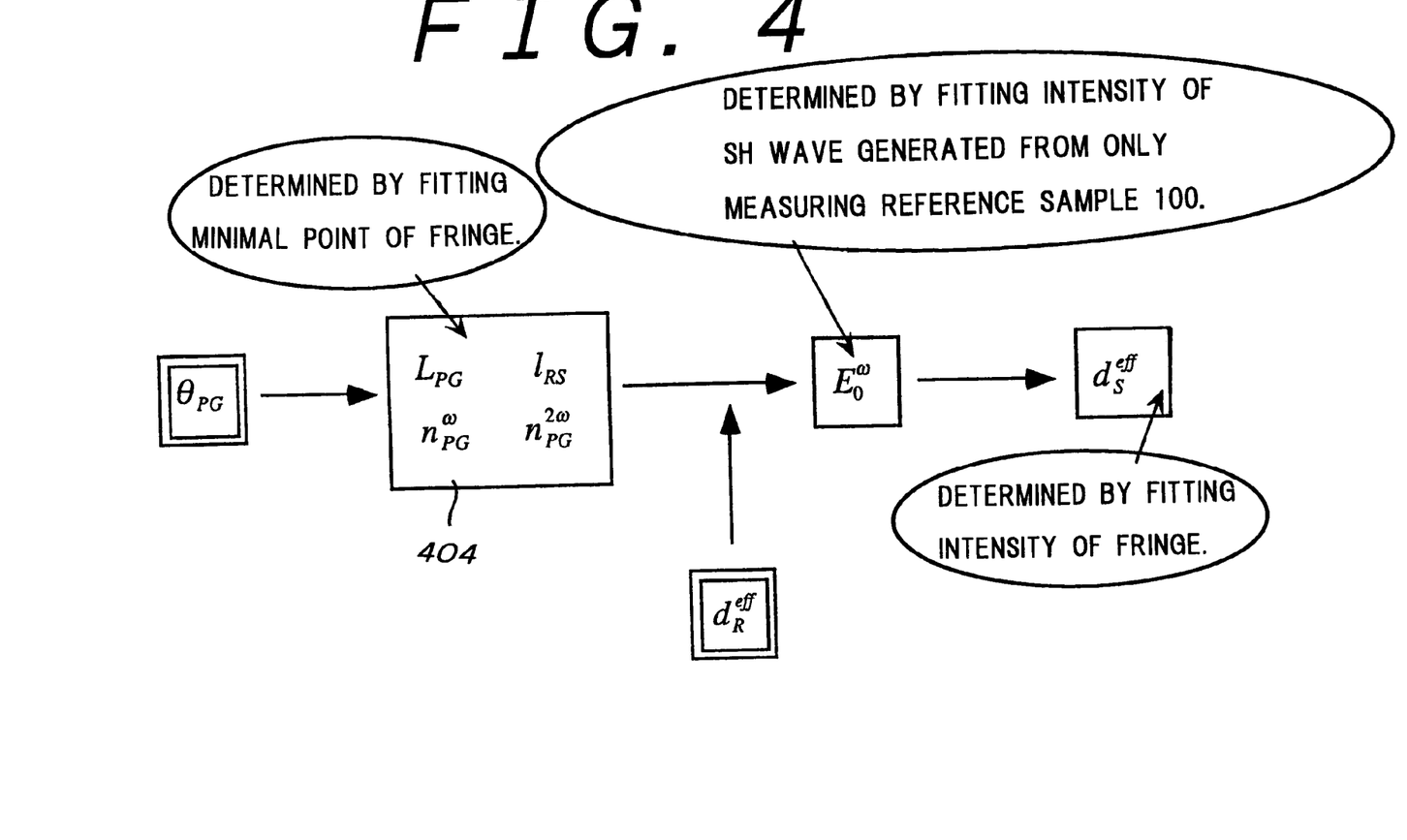
FIG. 4 is an explanatory view showing a relationship among input parameters and parameters obtained as outputs as a result of processing of fitting.

An effective second order nonlinear optical constant $d_S^{eff}$ of the object to be measured 200 being a value obtained as an output by the above described processing of fitting is obtained in accordance with a relationship as shown in FIG. 4 in relation to fitting parameters.

Namely, a calculation is made in such that $n_{PG}^{\omega}$ $n_{PG}^{2\omega}$ $L_{PG}$ $l_{RS}$ is determined by fitting of the minimal point of fringe on the basis of an angle $\theta_{PG}$ in the phase generator 20, amplitude intensity $E_0^{\omega}$ of fundamental wave before passing through the measuring reference sample 100 is determined by intensity fitting of SH wave generated from only the measuring reference sample 100 on the basis of an effective second order nonlinear optical constant $d_R^{eff}$ of the measuring reference sample 100, and an effective second order nonlinear optical constant $d_S^{eff}$ of the object to be measured 200 is determined by intensity fitting of fringe on the basis of the amplitude intensity $E_0^{\omega}$.

It is to be noted that factors described hereinafter are known values and fitting parameters being those required in case of determining SH wave power observed at the point A in FIG. 3(a).

Namely, the known values required in case of determining SH wave power observed at the point A in FIG. 3(a) include a wavelength of fundamental wave ($\lambda^{\omega}$=1064 nm), refractive indices in a frequency $\omega$ and a frequency $2\omega$ with respect to a thin film being the measuring reference sample 100 and a thin film being the object to be measured 200, refractive indices in a frequency $\omega$ and a frequency $2\omega$ with respect to the glass substrate 102 and the glass substrate 202 a second order nonlinear optical constants (values of $d_{31}$ and $d_{33}$), angles of incidence of fundamental wave with respect to the thin film being the measuring reference sample 100 and the thin film being the object to be measured 200, and film thicknesses of the thin film being the measuring reference sample 100 and the thin film being the object to be measured 200.

Furthermore, the factor $\phi_I^{2\omega}-2\phi_I^{\omega}$ appeared in the third term of the formula (5) or the formula (10) obtained by modifying the formula (5) indicates a cycle of fringe; and the following value's are introduced as fitting parameters in addition to refractive indices of air in the frequency $\omega$ and the frequency $2\omega$ being known values.

Namely, the values to be introduced are a thickness of the phase generator 20, refractive indices the frequency ω and the frequency 2ω of the phase generator 20, a distance between the measuring reference sample 100 and the object to be measured 200, and they are the parameters shown in the block 404 of FIG. 4.

In the following, an actual procedure for measurement will be described. First, a fringe obtained in the case when the object to be measured 200 was set on an optical path of the measuring apparatus 10 is output. Then, displacement from 0° is corrected to decide a position of valleys of the fringe. Thereafter, known values of a wavelength of fundamental wave ($\lambda^\omega$=1064 nm), refractive indices in a frequency ω and a frequency 2ω with respect to a thin film being the measuring reference sample 100 and a thin film being the object to be measured 200, refractive indices in a frequency ω and a frequency 2ω in the glass substrate 102 and the glass substrate 202, second order nonlinear optical constants (values of $d_{31}$ and $d_{33}$) of the measuring reference sample 100, angles of incidence of fundamental wave with respect to the thin film being the measuring reference sample 100 and the thin film being the object to be measured 200, and film thicknesses of the thin film being the measuring reference sample 100 and the thin film being the object to be measured 200 are input, besides, fitting parameters of a thickness of the phase generator 20, refractive indices in a frequency ω and a frequency 2ω of the phase generator 20, and a distance between the measuring reference sample 100 and the object to be measured 200 are input.

Moreover, searching extents and searching incremental breadths are input with respect to the thickness of the phase generator 20, the refractive indices in the frequency ω and the frequency 2ω of the phase generator 20, and the distance between the measuring reference sample 100 land the object to be measured 200 are input.

Then, intensity of SH wave produced from only the measuring reference sample 100 is output under the condition where the object to be measured 200 is not set on an optical path of the measuring apparatus 10, and amplitude intensity before passing through the measuring reference sample 100 is determined.

Finally, searching incremental widths of the second order nonlinear optical constant $d_s^{eff}$ the object to be measured 200 are input to obtain a fitting curve.

Figure 5:
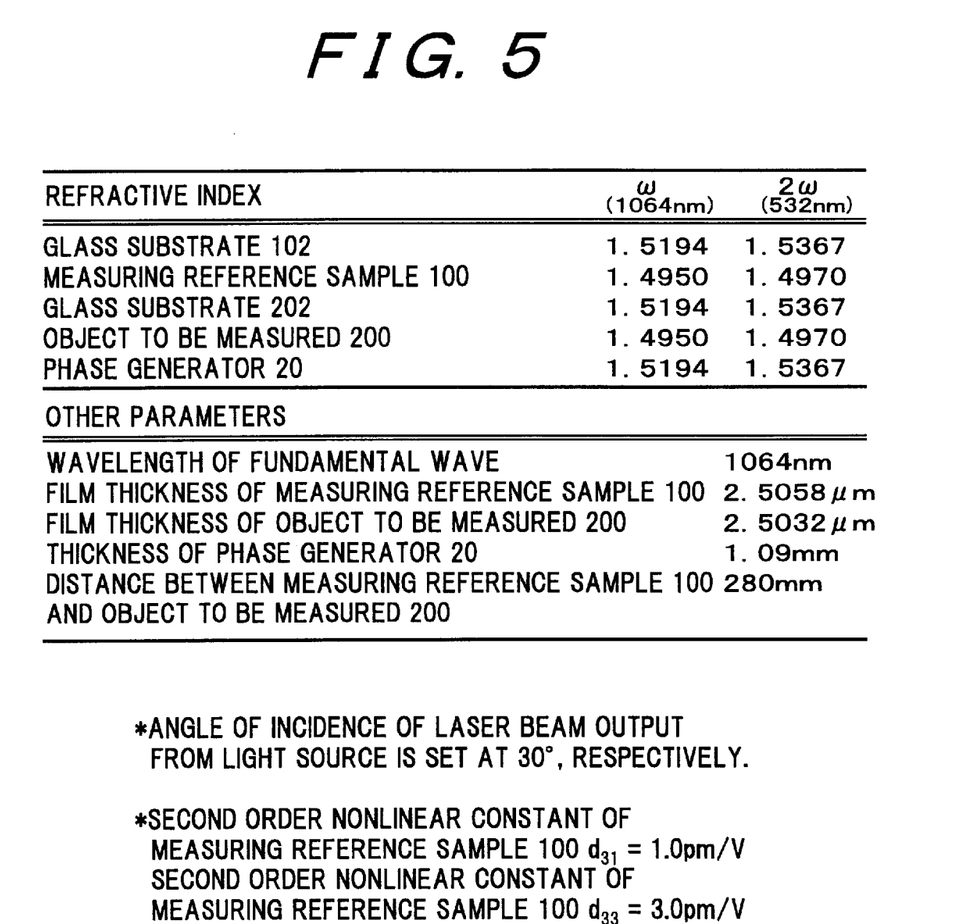
FIG. 5 is a table showing an example of parameters used in case of processing of fitting.

In FIG. 6, there are shown a fringe of a PNA/PMMA obtained by the above described measuring manner as well as a fitting curve obtained by the above described fitting manner in the case where the PNA/PMMA (more specifically, which corresponds to 0.2% PNA/PMMA poled polymer) is used for both the measuring reference sample 100 and the object to be measured 200 wherein values of respective parameters correspond to those shown in FIG. 5.

As a result of calculating an effective second order nonlinear optical constant from the fitting curve shown in FIG. 6, it was "−0.9±0.1 (pm/V)".

A sign ("+" or "−")of the above described calculation result means a relative direction of the absolute molecular orientation of the PNA/PMMA being the object to be measured 200 with respect to the absolute molecular orientation of the PNA/PMMA being the measuring reference sample 100.

More specifically, since a sign indicates "−" with respect to "−0.9±0.1 (pm/V)" being the calculation result shown in FIG. 6, it means that the absolute molecular orientation of the PNA/PMMA being the object to be measured 200 orientates to the direction opposite to the absolute molecular orientation of the PNA/PMMA being the measuring reference sample 100.

On the other hand, if a sign indicating the above described calculation result is "+", the absolute molecular orientation of the PNA/PMMA being the object to be measured 200 orientates to the same direction with that of the PNA/PMMA being the measuring reference sample 100.

Since the present invention has been constituted as described above, there is such an excellent advantage that an absolute molecular orientation can be calculated simultaneously with an effective second order nonlinear optical constant in an object to be measured without changing a measuring point.

Furthermore, since the present invention has been constituted as described above, there is such an excellent advantage that a period of time required for measuring an absolute molecular orientation and an effective second order nonlinear optical constant in an object to be measured can be reduced, so that a possibility of damaging the object to be measured can be minimized.

It will be appreciated by those of ordinary skill in the art that the present invention can be embodied in other specific forms without departing from the spirit or essential characteristics thereof.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-76122 filed on Mar. 17, 2000 including specification, claims, drawings and summary are incorporated herein by reference in its entirety.

What is claimed is:

1. A method for measuring simultaneously an absolute molecular orientation with an effective second order nonlinear optical constant, comprising:
   a first step for obtaining a fringe as to an object to be measured by the use of a measuring reference sample in accordance with phase second harmonic generating method wherein a single light source is used; and
   a second step for fitting said fringe obtained in said first step to obtain an effective second order nonlinear optical constant and at the same time, to obtain an absolute molecular orientation on the basis of a predetermined sign of said effective second order nonlinear optical constant.

2. A method for measuring simultaneously an absolute molecular orientation with an effective second order nonlinear optical constant as claimed in claim 1 wherein:
   the fitting in said second step conducts fitting of said fringe in such a manner that known values are substituted for an operation expression representing a power of second harmonics at the position where second harmonics generated from said measuring reference sample in accordance with said phase second harmonic generating method interfere with other second harmonics generated from said object to be measured thereby changing fitting parameters.

3. A measuring apparatus of the type containing a light source as well as a measuring reference sample, a phase generator, and an object to be measured which are successively disposed on an optical path of said light source, and obtaining a fringe as to said object to be measured by the use of said measuring reference sample in accordance with phase second harmonic generating method, for measuring simultaneously an absolute molecular orientation with an effective second order nonlinear optical constant, comprising:

a fitting means for fitting a fringe as to said object to be measured; and an acquiring means for obtaining an effective second order nonlinear optical constant on the basis of the fitting by said fitting means and at the same time, obtaining an absolute molecular orientation based on a predetermined sign of said effective second order nonlinear optical constant.

4. An apparatus for measuring simultaneously an absolute molecular orientation with an effective second order nonlinear optical constant as claimed in claim 3 wherein:

said fitting means conducts fitting of said fringe in such a manner that known values are substituted for an operation expression representing a power of second harmonics at the position where second harmonics generated from said measuring reference sample in accordance with said phase second harmonic generating method interfere with other second harmonics generated from said object to be measured thereby changing fitting parameters.

* * * * *